United States Patent [19]

Kovalsky et al.

[11] Patent Number: 5,591,978
[45] Date of Patent: Jan. 7, 1997

[54] ALL WAVELENGTH ULTRAVIOLET INTENSITY MONITOR

[75] Inventors: Alvin Kovalsky, 29226 Ocean Ridge Dr., Rancho Palos Verdes, Calif. 90275; Max D. Miller, Carson, Calif.

[73] Assignee: Alvin Kovalsky, Rancho Palos Verdes, Calif.

[21] Appl. No.: 281,446

[22] Filed: Jul. 27, 1994

[51] Int. Cl.$^6$ .................................................. G01J 5/00
[52] U.S. Cl. ................................................................ 250/372
[58] Field of Search ........................... 250/372 R, 372 EM

[56] References Cited

U.S. PATENT DOCUMENTS

| | | | |
|---|---|---|---|
| 3,634,747 | 1/1972 | Loftus | 327/103 |
| 3,710,115 | 1/1973 | Jubb | 250/372 EM |
| 4,229,733 | 10/1980 | Tulenko et al. | 340/500 |
| 4,468,562 | 8/1984 | Wicnienski et al. | 250/372 |
| 4,485,306 | 11/1984 | Braunstein et al. | 250/372 EM |
| 4,704,535 | 11/1987 | Leber et al. | 250/372 EM |
| 4,851,686 | 7/1989 | Pearson | 250/372 EM |
| 5,036,311 | 7/1991 | Moran et al. | 340/600 |

FOREIGN PATENT DOCUMENTS

| | | | |
|---|---|---|---|
| 55-26470 | 2/1980 | Japan | 250/372 EM |
| 56-70430 | 6/1981 | Japan | 250/372 EM |

Primary Examiner—Constantine Hannaher

[57] ABSTRACT

A multipurpose all-wavelength intensity monitor for determining and monitoring the output intensity of ultraviolet sources. The unit measures ultraviolet wavelengths of 365 nanometers, 300–312 nanometers, and 254 nanometers without changing sensors or switches and the monitor is based on measurement utilizing a time period with a precalibrated microjuole setting. The intensity is determined by measuring the time period elapsed from the beginning of the monitoring to a tone sound which indicates the end of the monitoring period. This time period is compared to a chart with a curve for each of the ultraviolet wavelengths. Using the curve with the known time elapsed will indicate the intensity output. The monitor indicates loss of intensity by comparing lengthening of the monitored time or by indicating the actual intensity using the time output curves. A modified stopwatch can start the timing when unit is actuated and stop the timing when tone is sounded.

4 Claims, 3 Drawing Sheets

ALL WAVELENGTH ULTRAVIOLET INTENSITY MONITOR

BACKGROUND OF INVENTION

1. FIELD OF INVENTION

The present invention relates generally to the field of measurement and monitoring of ultraviolet ray emitting output intensity of ultraviolet equipment and tubes. The invention specified relates particularly to wavelengths ranges within 200 to 400 nanometers.

2. DESCRIPTION OF PRIOR ART

Ultraviolet instruments have been implemented to the many uses in a wide range of applications. Requirements vary in applications such as polymerization of industrial coatings, inks and adhesives sterilization. Inspection of the printed circuit boards, non-destructive testing using fluorescent penetrated and magnetic particle techniques are examples of use. Manufacturing of printing plates, photolithographics proven for microchips, phototheropeutic treatments, sanitation & water purification and a number of other applications exist and are still evolving.

Ultraviolet applications are generally divided into three wavelengths:
Shortwave: germicidal or UV-C have wavelengths at approx 254 nm.
Midrange: UV-B have wavelengths at approx 300–312 nm.
Longwave: Blacklight, Woods or UV-A have wavelengths at 365 nm. With the wide range of applications for ultraviolet uses, the output intensity becomes an important factor. As output intensity decays, so that performance and operation of various uses are effected. Several factors can effect the output intensity of ultraviolet lamps. First as the tubes age, the output intensity will decrease. Secondly the magnetic ballast will age and can possibly effect the performance of the ultraviolet output and if filter glass is used with shorter wavelength lamps, the filter glass can solarize over time also effecting the output intensity.

3. DESCRIPTION INTENSITY READING OF ULTRAVIOLET LAMPS AND EQUIPMENT

An Ultraviolet Radiometer is an instrument that will sense the output of an ultraviolet source and through the use of a various ultraviolet sensors, measures the photocurrent directly as an output reading in watts per square centimeter. The watts are generally in milliwatts or microwatts. The indication initially was in an analog meter later giving way to digital meter readings. The prior units utilize narrow band filter on the sensors, thus requiring different sensors for the different ultraviolet wavelengths. Present design of radiometers are designed for a more specialized light measurement. The accuracy of these units are relatively high, but the cost of the units and individual sensors is also high. The units are usually equipped with range switches and the digital readout is generally 3.5 to 4 digit readout.

4. FEATURES OF THE ALL-WAVE ULTRAVIOLET MONITOR

1. The all-wave UV intensity monitor is a small self contained unit with sensors built in.
2. The all-wave UV intensity monitor will monitor all ultraviolet wavelengths with the same sensor.
3. There is no meter to indicate intensity. All monitoring is done by an elapsed time concept.
4. The cost of the all-wave UV intensity monitor is considerably lower than any other method of measuring or monitoring UV output.
5. The all-wave intensity monitor is designed as a reference device to monitor changes over time, but can be used to determine the actual output within a relative margin.
6. The all-wave UV intensity monitor is designed to be used by manual timing, but with a modified stop watch operation can be automatic.
7. The intensity measurement is determined by use of a chart using the elapsed time from start to cycle end tone. (See FIG. 1)
8. The all-wave UV intensity monitor is designed to fit in a garment pocket.

5. REFERENCES AND PRIOR ART STATEMENT

The inventors have also researched the literature and discuss the following patents:

1. U.S. Pat. No. 3,971,943 by Jeunehomme and Essad describes a specially designed transducer for monitoring exposure of human eyes and other parts of the body. The transducer design incorporates several special filters and also uses electronic circuitry to use the signal output of the transducer coupled to a digital voltmeter. The unit is designed specifically to determine the exposure level to human body parts.

2. U.S. Pat. No. 4,065,672 by Harpster discloses an ultraviolet sensor and exposure instrument designed primarily for sensing sun exposure on animals. The unit is designed primarily as a warning device for a specific wavelength and purpose and cannot determine the actual level of ultraviolet intensity.

3. U.S. Pat. No. 4,087,692 by Lecujer and Crousillac is an apparatus for measuring atomic radiation and does not involve ultraviolet wavelengths.

4. U.S. Pat. No. 4,272,679 by Blader discloses an ultraviolet sensor. This patent is for the sensor only and does not incorporate means for determining the intensity being sensed.

5. U.S. Pat. No. 4,629,896 by Bridgen discloses a design for monitoring the intensity of water sterilization systems. The unit is designed for a specific application requiring apparatus to direct the emission from a water sterilization system.

6. U.S. Pat. No. 5,107,123 by Shu discloses a design for accumulating the exposure from the sun to determine the sun tanning effect on the skin while sun bathing.

SUMMARY OF THE PRESENT INVENTION

The allwave ultraviolet intensity monitor invention is specifically designed to be used as a low cost method of detecting the degradation of ultraviolet equipment and lamps. The main characteristics for the specified applications are lower cost, easy one button use, all wavelength capability and compact size. The simple one switch on/off operation provides intensity indication regardless of wavelength for a wide range of applications not available in products present existing on the market.

BRIEF DESCRIPTION OF THE TABLES

Table 1. lists the materials used to produce the allwave ultraviolet intensity monitor.

Table 2. lists the material required to control the stopwatch function.

Table 3. lists the truth tables for the exclusive "or" gates.

DETAILED DESCRIPTION OF THE ALL-WAVE UV INTENSITY MONITOR INVENTION

Figure 3:
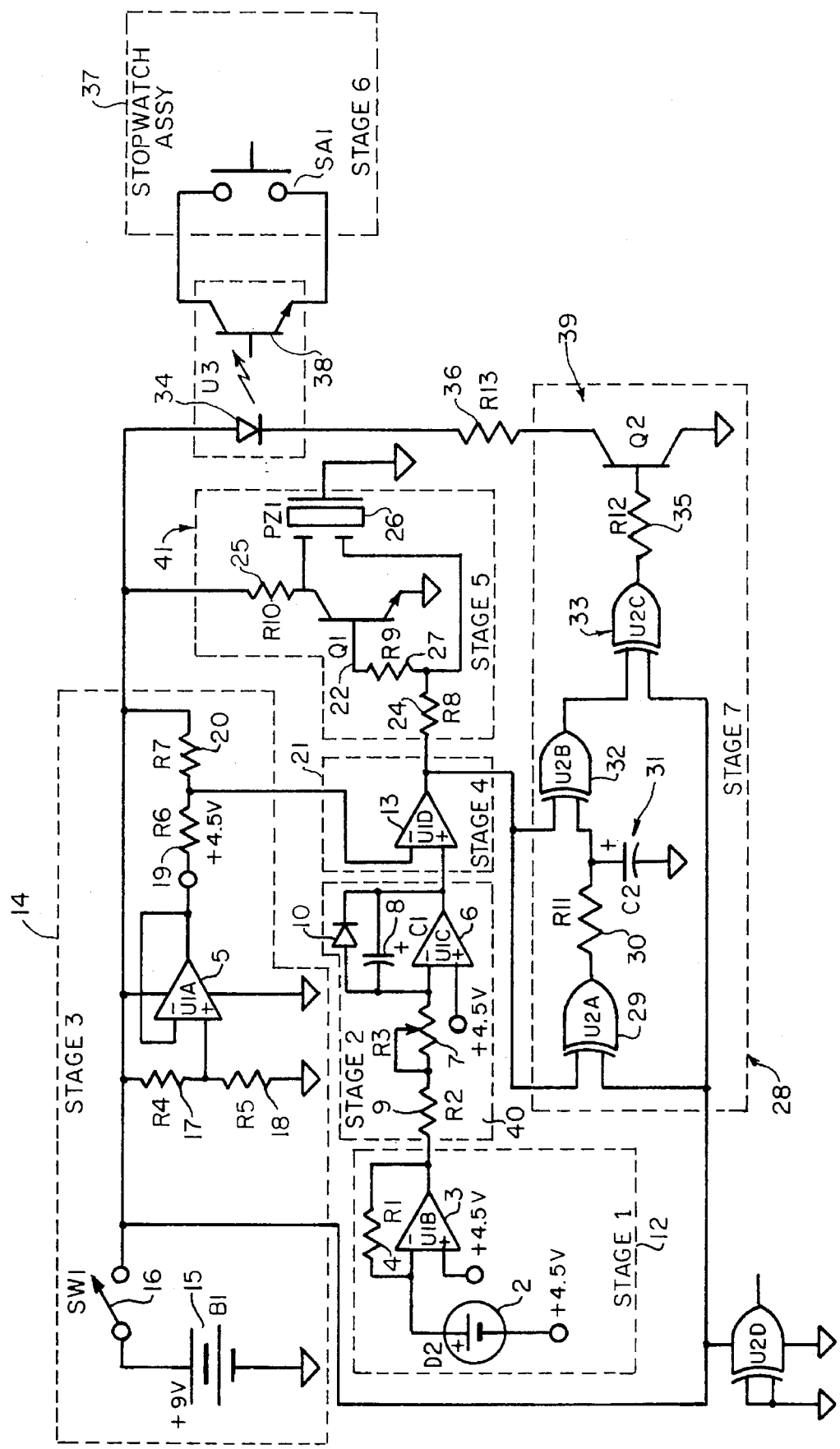
FIG. 3 is an electrical schematic of the allwave ultraviolet intensity monitor.

The all-wave UV intensity monitor invention comprises a series of stages as shown in FIG. 3.

Referring now to FIG. 3, the allwave UV intensity monitor 1, according to a preferred embodiment of the present invention and in which is the first stage 12, provides for ultraviolet light to come through the ultraviolet filter to photodiode 2, which is sensitive to the ultraviolet region of light. This exposure creates a current proportional to the to the amount of the light exposed to the operational amplifier 3, which forms current to voltage conversions. Resistor 4, sets the current to voltage relationship.

$V_{out} = I_{in}/R_1$

There is a direct relationship from the amount of energy at photocell 2, and the voltage of operational amplifier 5.

The output of operational amplifier 5, becomes the input to the second stage operational amplifier 6, which operates as an integrator. The integration time constant is established by a variable resistor 7, and a capacitor 8. Resistor 9, is a fixed resistor to provide a minimum voltage protection when variable resistor 7, is shorted. The diode 10, is used to discharge capacitor 8, when power is turned off. The output of the second stage is:

$$V_{out} = \frac{-1}{(R_9 + R_7)C_8} \int_0^T V_{in} dt$$

Where $V_{out}$ is the output of the second stage integrator 11, and the limits are from zero to T, where T is the time for the input voltage to stage four 11, operational amplifier 13, to reach the reference voltage. The integration over time is dt.

Stage three 14, provides the power to the unit. This stage starts with a battery 15. The power is actuated by switch 16, which provides power to the voltage divider resistor 17, and resistor 18. The input voltage to the operationalamplifier 5, is ½ the source voltage. The inverting input is tied to the output which clamps the output voltage to the same as the input, forming a voltage follower or buffer. This provides a stable source voltage. Resistor 19, and resistor 20, are another voltage divider which will divide the output of operational amplifier 5. This voltage is used as a reference voltage for stage four 21.

Stage four 21, is a comparator. The inverting input to operational amplifier 13, is the reference voltage. When the non-inverting input exceeds the reference voltage, the output of operational amplifier 13, is turned on (goes high) and a bias voltage is supplied to transistor 22.

Stage five 23, is a transistor 22, used as an oscillator. The output of operational amplifier 13, is fed through resistor 24, providing the bias voltage to transistor 22. When transistor 22 is turned on, it supplies a voltage from the transistor 22, load resistor 25, to the piezoelectric transducer 26 causing it to vibrate at an audible frequency indicating the end of the cycle. The feedback lead of the piezoelectric transducer 26, supplies the necessary feedback for oscillation. Resistor 27 provides the proper load voltage for the piezoelectric transducer 26, feedback.

Figure 1:
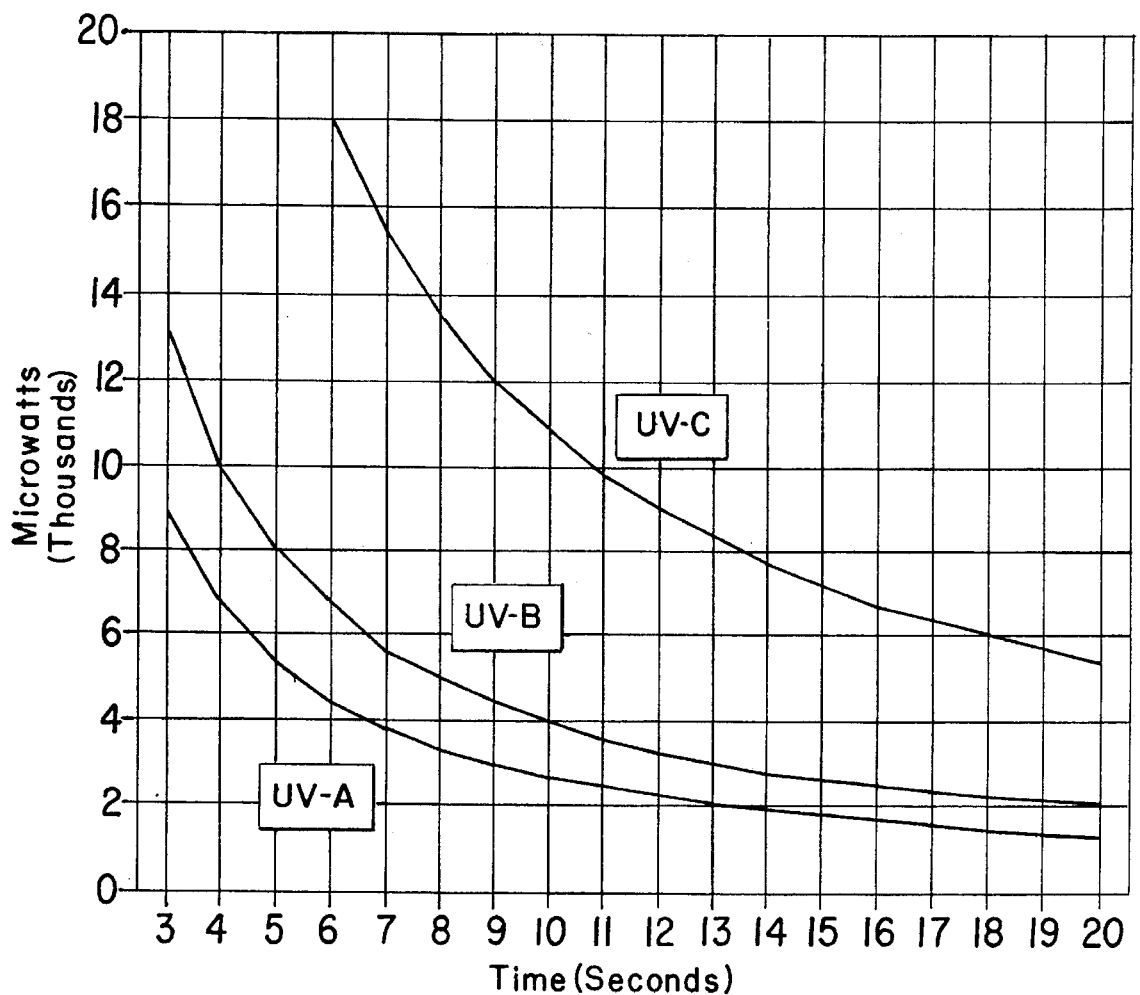
FIG. 1 are curves indicating time verses intensity for the ultraviolet wavelengths whereby utilizing the time elapsed will provide the ultraviolet intensity output.
Figure 4:
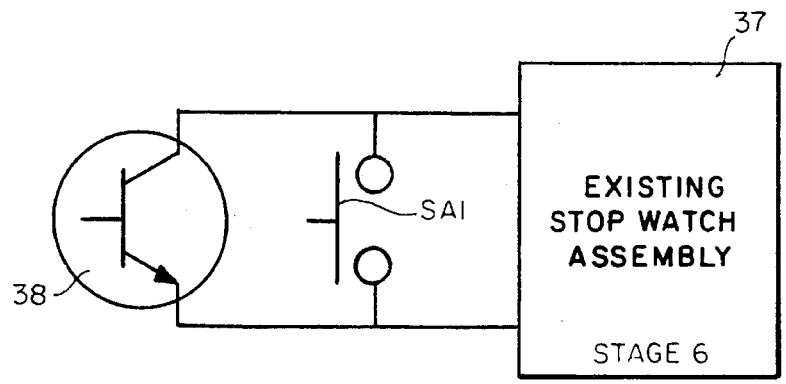
FIG. 4 is an electrical schematic showing the modification to a standard stop watch.
Figure 2:
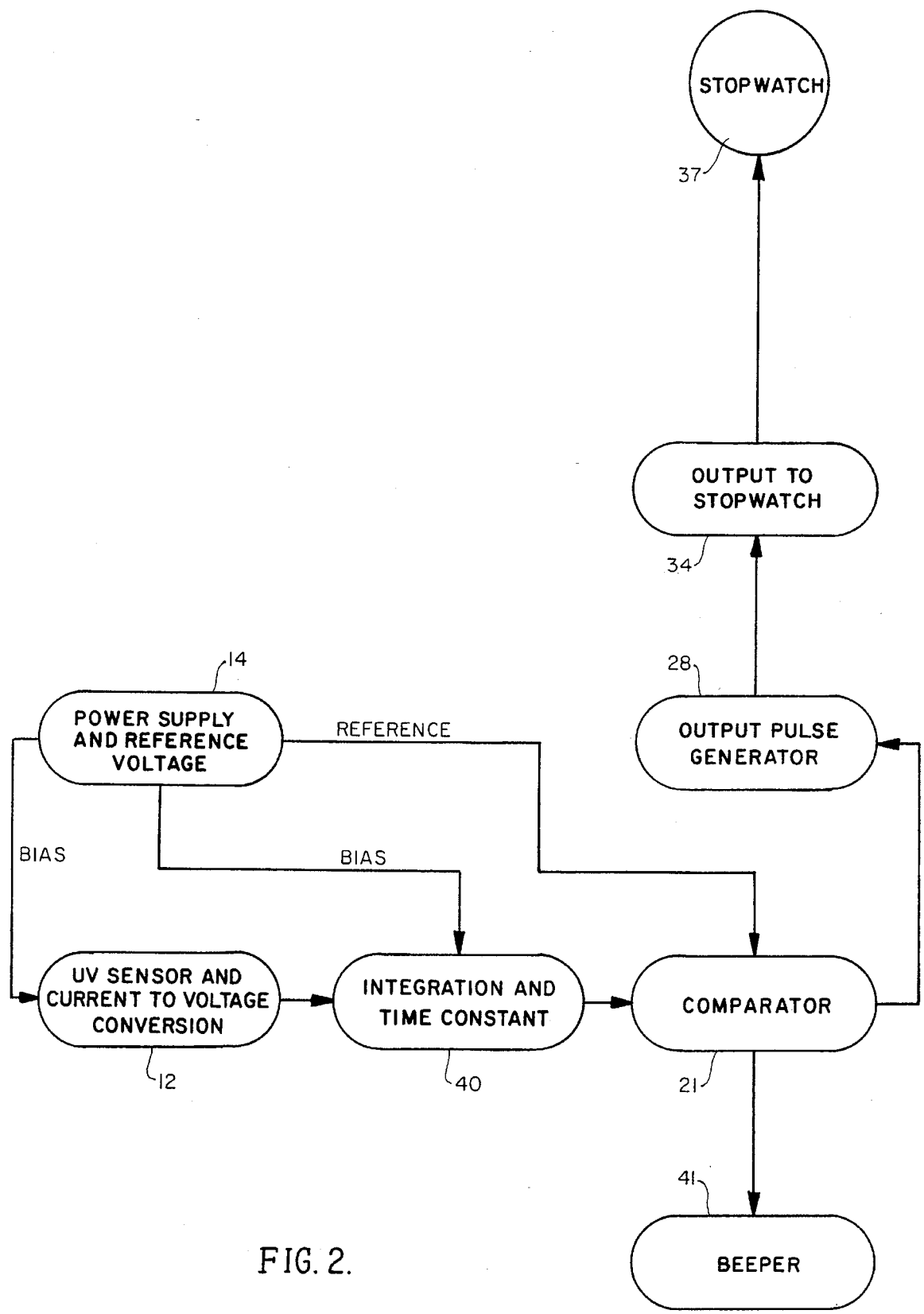
FIG. 2 is the block diagram of the various stages of the invention.

Stage 28 is used to start and stop an external stop watch. The output of stage 4, operational amplifier 13, is fed to one input of an exclusive "or" gate 29. The other input of exclusive "or" gate 29, is tied to the source voltage forming an invertor. The output of this invertor 29, is fed to a low pass filter resistor 30, and capacitor 31. When the unit is turned on, the output of exclusive "or" gate 29, goes high charging capacitor 31, through resistor 30. The two inputs to exclusive "or" gate 32, are low thus the input of exclusive "or" gate 32, is low. When capacitor 31, charges up, it produces a high on one input of the exclusive "or" gate 32, which provides a high on the output of exclusive "or" gate 32. The output of the invertor 29, begins to discharge capacitor 31. While capacitor 31, is discharging, both inputs of the exclusive "or" gate 32, are high causing its outputs to be low. After capacitor 31, discharges, one input to the exclusive "or" gate 32, is high causing the output of the exclusive "or" gate 32, to go high. The output of the exclusive "or" gate 32, goes to the input of the exclusive "or" gate 33. The purpose of the exclusive "or" gate 33, is to invert the signal so that the input to the input to the infra red light emitting diode 34, will flash at the beginning of the cycle and the end of the cycle. Resistor 35, supplies the bias voltage and resistor 36, establishes the load. The flashes in the unit are transmitted to transistor 38, which acts as a switch to the modified stop watch 37. The modification to stop watch 37, provides wires in parallel with the switch in stop watch 37. Dividing the number of seconds elapse into the preset joules setting will provide the user with the output intensity of the ultraviolet source being monitored. (see FIG. 1 for the curve representing time vs output intensity for all wavelengths)

STATE OF THE ART

1. ULTRAVIOLET RADIOMETERS

Ultraviolet Radiometers presently on the market are basically digital voltmeter displays that utilize external sensors for the different wavelengths. The units generally provide for plug in connection and the units have a range switch for selection of the range being read. The reading is generally as soon as the sensor is exposed to the device being checked. The units utilize liquid crystal displays or for the more sophisticated units light emitting diodes for the readout to indicate the intensity reading.

PREFERRED EMBODIMENT

The preferred embodiments for the invention used components as specified in Tables 1 and 2 to fabricate the apparatus. The circuit board was a standard commercial item described in the tables. The case, electrical components and the stop watch are also standard commercial parts as described in tables 1 and 2.

While certain exemplary embodiments of this invention have been described above, it is to be understood that such embodiments are merely illustrative of, and not restrictive on, the broad invention and that we do not desire to be limited in our invention to specific construction or arrangements shown and described, because various other obvious modifications may occur to persons having ordinary skill in the art.

TABLE 1

| REF DES | VALUE/TYPE | DESCRIPTION |
|---|---|---|
| B1 | 9VOLT | DURACELL MN1604 OR EQUIV. |
| C1 | 10MF 16V TANT | DIGIKEY #P2038 |
| C2 | 1MF 16V TANT | DIGIKEY #P2105 |

TABLE 1-continued

| REF DES | VALUE/TYPE | DESCRIPTION |
|---|---|---|
| D1 | 1N4148 | DIGIKEY #1N4148PH |
| D2 | VT3072 | EG&G VACTEC PHOTODIODE |
| LED1 | NTE3029A | NTE ELECTRONICS IR LED |
| PZ1 | 273-064 | RADIO SHACK PIEZO BEEPER |
| Q1 | 2N3904 | DIGIKEY #2N3904-ND |
| Q2 | 2N3904 | DIGIKEY #2N3904-ND |
| Q3 | NTE3038 | NTE ELECTRONICS PHOTOTRANSISTOR |
| R1 | 33K 1/8W | DIGIKEY #33KE-ND |
| R2 | 100K 1/8W | DIGIKEY #100KE-ND |
| R3 | 500K POT. | DIGIKEY #U262R504B-ND |
| R4 | 1M 1/8W | DIGIKEY #1ME-ND |
| R5 | 1M 1/8W | DIGIKEY #1ME-ND |
| R6 | 1M 1/8W | DIGIKEY #1ME-ND |

TABLE 2

| R7 | 1M 1/8W | DIGIKEY #1ME-ND |
|---|---|---|
| R8 | 220K 1/8W | DIGIKEY #220KE-ND |
| R9 | 10K 1/8W | DIGIKEY #10KE-ND |
| R10 | 2K 1/8W | DIGIKEY #2KE-ND |
| R11 | 10K 1/8W | DIGIKEY #10KE-ND |
| R12 | 10K 1/8W | DIGIKEY #10KE-ND |
| R13 | 470 1/8W | DIGIKEY #470E-ND |
| SW1 | ON-OFF SWITCH | DIGIKEY #EG1906-ND |
| SW2 | START/STOP SW | EXISTING IN STOPWATCH ASSY |
| U1 | LM324 | QUAD OP-AMP, DIGIKEY #LM324N-ND |
| U2 | CD4030 | QUAD XOR GATE, DIGIKEY CD4030CN-ND |
| W1 | STOPWATCH ASSY | SPORTLINE ECONOSPORT 240 |
| CASE | HM-9VB | PACTEC HM SERIES W/9V BATTERY HOLDER |
| UV FILTER | UG-325 | HOYA LONG LIFE UV FILTER GLASS |

TABLE 3

TRUTH TABLE EXCLUSIVE "OR" GATE

| INPUTS | | OUTPUTS |
|---|---|---|
| A | B | OUT |
| 0 | 0 | 0 |
| 0 | 1 | 1 |
| 1 | 0 | 1 |
| 1 | 1 | 1 |

What is claimed is:

1. An electronic monitor for use with all ultraviolet wavelengths comprising:

(a) a first stage sensitive to all ultraviolet wavelengths providing a current proportional to the amount of ultraviolet exposure, (b) a second stage coupled to said first stage operating as an integrator to establish a fixed constant in joules, (c) a fourth stage coupled to the outputs of said first and said second stages constituting a comparator, (d) a fifth stage coupled to said fourth stage constituting an oscillator supplying an activating signal to cause an audible tone indicating the end of cycle, (e) a sixth stage which incorporates a modified stop watch to indicate the time elapsed from start of measurement to end of measurement, and (f) a third stage operably coupled to said first, second, fourth, fifth and sixth stages providing power thereto and incorporating a voltage divider and supplying reference voltages.

2. An electronic monitor for measuring and indicating the strength of emitted ultraviolet rays comprising:

an ultraviolet sensor;

signal generator coupled to said sensor producing an output signal in response to activation of said sensor by ultraviolet rays;

a current-to-voltage conversion circuit connected to said signal generator receiving said output signal to produce a voltage signal;

an integration circuit coupled to said current-to-voltage conversion circuit responsive to said voltage signal to produce a reference voltage;

a timing circuit connected to said integrator circuit for establishing a time constant voltage;

a comparator circuit operably connected in parallel to said integrator circuit and said timing circuit responsive to said reference voltage and said time constant voltage to produce an operational voltage;

a stopwatch;

a beeper; and said stopwatch and said beeper for receiving said operational signal simultaneously for operating said stopwatch and said beeper to indicate end of cycle.

3. The invention as defined in claim 2 including:

a feedback circuit coupled between said comparator circuit and said beeper.

4. The invention as defined in claim 3 including:

a gating circuit operably coupled to said comparator circuit;

a light emitting diode operably coupled to said gating circuit for emitting a light signal in response to said gating circuit for indicating beginning and ending of an operational cycle.

* * * * *